Figure 1:
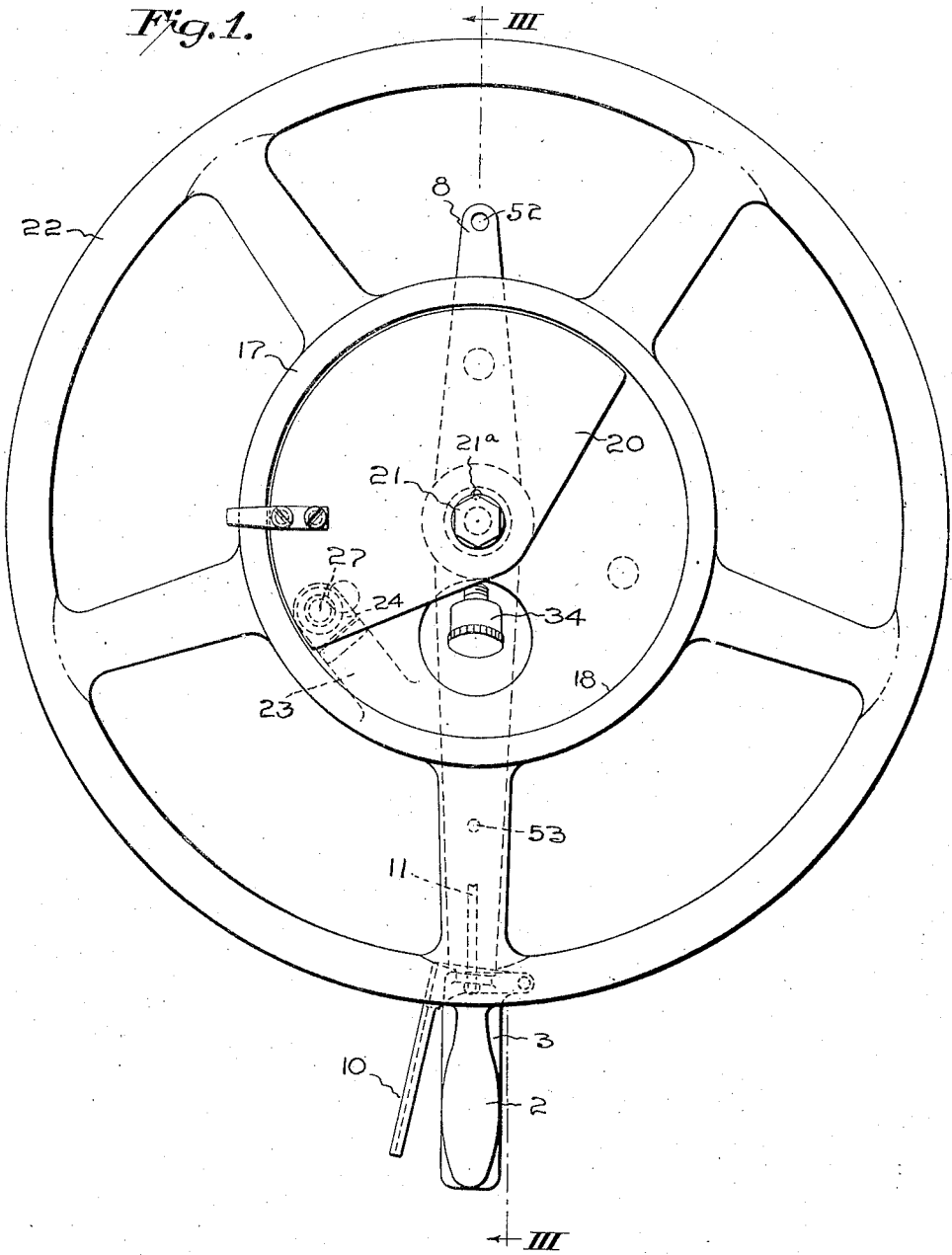

Feb. 15, 1927.
W. H. GRANSDEN
1,617,841
CONTROL DEVICE
Filed Oct. 21, 1924      4 Sheets-Sheet 2
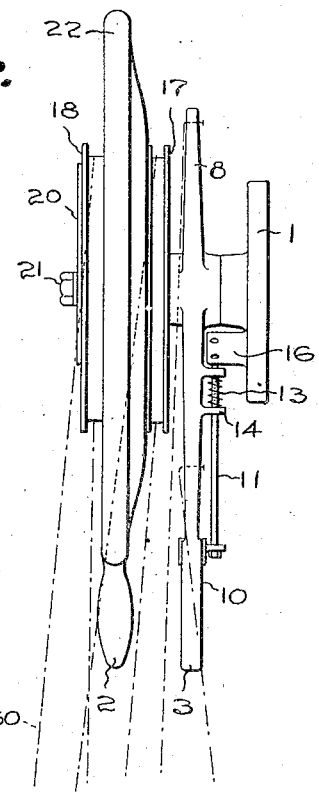
Fig. 2.
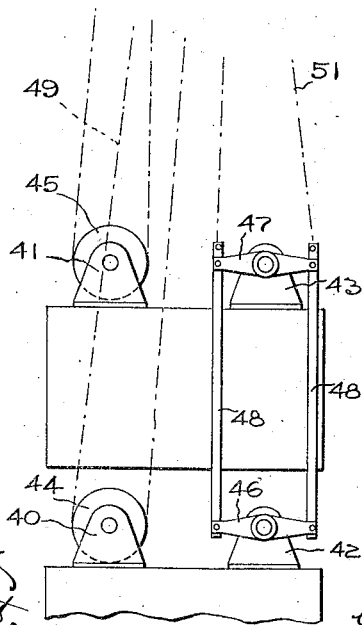
WITNESSES:
R. S. Harrison
M. B. Jaspert.
INVENTOR
William H. Gransden
BY
Wesley G. Carr
ATTORNEY Feb. 15, 1927.
W. H. GRANSDEN
CONTROL DEVICE
Filed Oct. 21, 1924 4 Sheets-Sheet 3
1,617,841
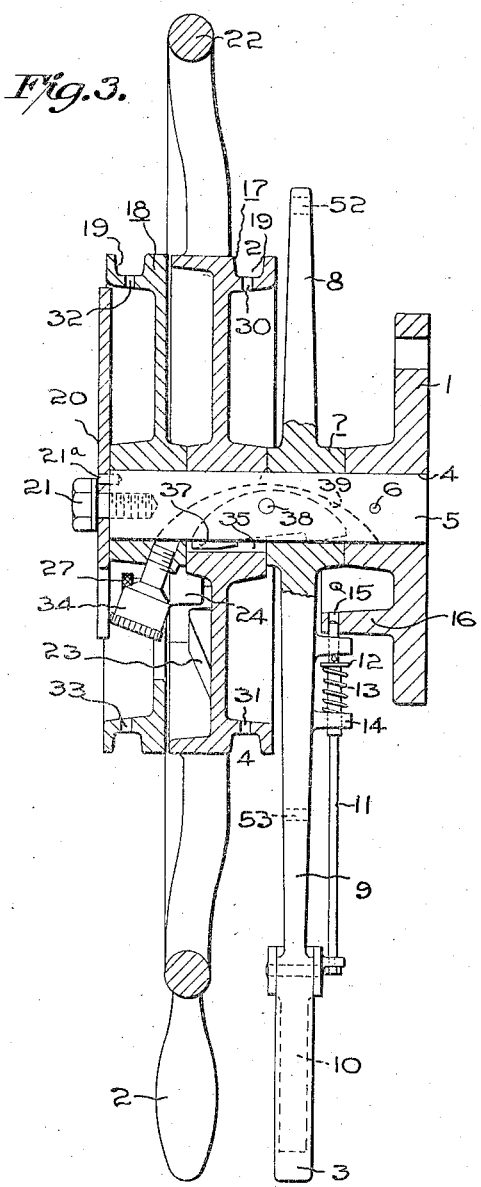
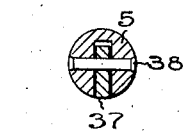
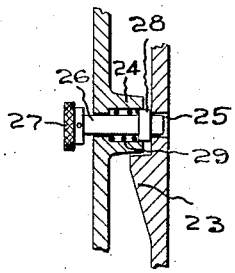
WITNESSES:
R. S. Harrison
W. B. Jaspert
INVENTOR
William H. Gransden
BY
Wesley G. Carr
ATTORNEY Feb. 15, 1927. 1,617,841
W. H. GRANSDEN
CONTROL DEVICE
Filed Oct. 21, 1924  4 Sheets-Sheet 4
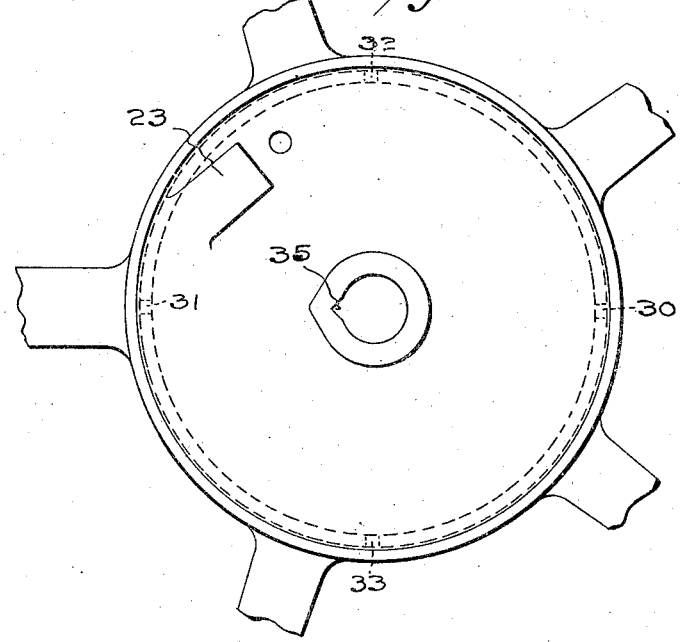
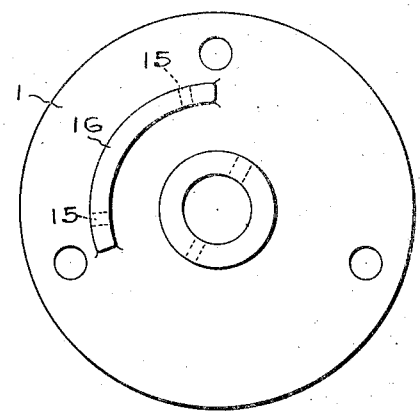
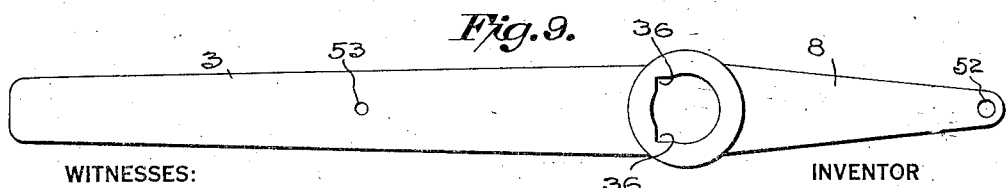

Patented Feb. 15, 1927.

1,617,841

UNITED STATES PATENT OFFICE.

WILLIAM H. GRANSDEN, OF TULSA, OKLAHOMA, ASSIGNOR TO WESTINGHOUSE ELECTRIC & MANUFACTURING COMPANY, A CORPORATION OF PENNSYLVANIA.

CONTROL DEVICE.

Application filed October 21, 1924. Serial No. 744,897.

My invention relates to control mechanisms, more particularly to the operating mechanism for earth boring machines embodying an electric drive comprising a plurality of electric motors.

It is among the objects of my invention to provide a control mechanism for the operation of twin motor drives which shall be of simple and compact construction and which shall be efficient in its operation to regulate the drive motors in accordance with the operating requirements for earth boring operations and the like.

Another object of my invention is to provide a control mechanism of the above designated character, which shall be designed to co-ordinate the function of a plurality of drive units and to facilitate the regulation of such units by concentrating the operative members into a single mechanism, the parts of which are readily accessible to the operator.

In a co-pending application, Serial No. 237,566, filed May 31, 1918, and assigned to the Westinghouse Electric and Manufacturing Company, which application matured into Patent No. 1,511,990 on October 14, 1924, is disclosed a drive mechanism for earth boring machines embodying a pair of electric motors which are coupled in such manner as to co-ordinate their function in the drilling operation.

My present invention is directed to control means for regulating the motors to produce desirable running characteristics for the varying stages of the drilling operation in accordance with the nature of the earth strata which the drilling member encounters. The object of the "twin" motor drive is to obtain independent control of the motors for varying the division of power therebetween to obtain a resultant speed or speed-torque characteristic during the joint operation thereof and no particular difficulties have been encountered in controlling the motors for normal drilling operations.

However, for the auxiliary operations of pulling the bailer, or tools, or running the casing, it has been found that the controller grids are frequently burnt out by reason of the negligent operation of but one of the motors at excessive overloads because of the difficulty of connecting the control levers or because of the operator's refusal to so connect them as to make both motors operative. The connecting of the controller levers as heretofore constructed is a cumbersome operation and my invention provides an interlock for connecting the control manipulating device to make the controllers independently operative for drilling operations but readily connectible for the auxiliary operations of "pulling out".

In the accompanying drawings, constituting a part hereof and in which like reference characters designate like parts—

Figure 1 is a plan view of a control mechanism embodying the principles of my invention, Fig. 2 is a diagrammatic view illustrating the manner of connecting the control member to the motor control and regulating device, Fig. 3 is a view, partially in section and partially in elevation, of the control mechanism taken along the line III—III of Fig. 1, Fig. 4 is a fragmentary portion of the control mechanism showing the stop pin by means of which the several sheave wheels are interlocked, Fig. 5 is a side elevational view of the key which is pivotally mounted in the control head, Fig. 6 is a longitudinal sectional view of the pivot member showing the manner of mounting the key, Fig. 7 is a fragmentary view of one of the sheave wheels, Fig. 8 is a plan view of the base member, and Fig. 9 is a plan view of the pole changing lever embodied in the control mechanism.

Referring to Fig. 3, the control mechanism comprises a base 1 which is adapted to be secured to the headache post of an oil well drilling rig in such manner that the handle portions 2 and 3 of the sheave wheel and pole changing lever are vertically disposed and in an extremely low position. The base member 1 is provided with a center opening 4 adapted to receive a spindle or stud shaft 5 which is secured to the base in any suitable manner as by a dowel pin 6. A pole changer lever 7 is pivotally mounted to the shaft 5 and comprises two projecting portions 8 and 9 respectively, the latter terminating in the handle portion 3, which is provided with a handle 10 that is pivotally connected thereto and associated with a rod 11 which is movable co-axially with the lever 7. The rod 11 is provided with a sleeve 12 having a spring 13 resting against a flange thereof and the spring 13 further engages one of a pair of lugs 14 attached to the portion 9 of the lever, through which lugs the rod 11 is adapted to extend into a pair of openings 15 provided in a vertically projecting segment portion 16 of the base member 1. A pair of sheave wheels 17 and 18 having peripheral grooves 19 provided therein are pivotally mounted on the shaft member 5 and a cover plate 20 is secured to the latter by a cap bolt 21 and dowel pin 21a.

The wheel 17 is provided with a hand wheel 22 having the handle 2 projecing therefrom and is further provided with a stop lug 23 adapted to engage a depending portion 24 of the wheel 18. The wheel 17 is further provided with an opening 25 which is adapted to receive a spring supported stop pin 26 having a knurled head 27, Fig. 4. The pin 26 is provided with a shoulder 28 to support a spring member 29 that is disposed around the pin and adapted to rest against the lower face of the wheel 18.

The wheels 17 and 18 are provided with a plurality of openings 30, 31, 32 and 33 respectively. The upper sheave wheel 18 and the cover plate 20 are provided with openings to give access to a grease cup 34 which provides lubrication to the several pivot members and to permit releasing of the stop pin 26 when the relative position of the wheel 18 and cover plate 20 is such that the pin 26 and opening in the plate register. The wheel 17 and pole changing lever 7 are provided with notches 35 and 36, as shown in Figs. 3, 7 and 9 respectively, which are adapted to engage a double-acting key member 37 to prevent the pole changing lever and the control operating levers from being moved at the same time. The key is pivotally secured by a pin 38 in a slotted opening 39 of the shaft member 5. The engaging faces of the key 37 are bevelled to correspond to the shape of the openings 35 and 36 whereby they readily slip into and out of engagement.

Referring to Fig. 2, the control mechanism is operatively connected to a pair of controllers 40 and 41 and a pair of pole changers 42 and 43. The controllers are provided with sheave wheels 44 and 45 and the pole changers with pivot yokes 46 and 47, the latter being connected by parallel levers 48 which are pivotally secured thereto.

The controller sheave 44 is connected to the control mechanism by a guy wire 49, one end of which is secured in the opening 30 and the other end in the opening 31 of the sheave wheel 17, Fig. 3. The controller wheel 45 is similarly connected by a guy wire 50, which is secured in the openings 32 and 33 respectively of the sheave wheel 18. The pole changer is connected by a wire 51 to openings 52 and 53 in the pole changing lever 7.

Referring to Figs. 2 and 3, the operation of this device is briefly as follows: By interlocking the sheave wheels 17 and 18 by the pin 26, they are jointly operative by manipulating the handle 2 or hand wheel 22. The sheave member 17 may be operated independently of the sheave wheel 18 by releasing the stop pin 26, this being accomplished by simply lifting the same out of the opening 25 provided in the sheave wheel 17 only when the pin 26 registers with the opening in the plate 20. It is necessary to provide independent operation of the wheels 17 and 18 as it is found necessary to regulate the controllers 40 and 41 individually for the drive motors. On the other hand, the pole changers are operated simultaneously by means of the lever 7.

The pole changing lever 7 and the control operating sheaves 17 and 18 are prevented from operating at the same time by the double key 37 pivoted in the stud shaft 5. The sheave wheel 17 must have its keyway or notch 35 registered with the key 37 before the pole changing lever is operative, for in this position only, which is the neutral or zero position of the control sheaves 17, will the key 37 slip out of the notches 36 of the lever 7 into the notch 35 of the wheel 17 leaving the lever 7 free to be moved.

With the pole changing lever thus movable, the control sheave 17 will remain in its neutral position and be immovable until the lever 7 reaches one of the working positions at which time one of the notches 36 will register with the key 37 and the control operating sheave 17 again becomes movable. Consequently, the lever 7 cannot be moved until the sheave wheel 17 is again brought to its neutral position.

When the pole changing lever 7 is in one of its operating positions, the control operating sheave 17 can be moved in either direction and the sheave wheel 18 will move with the wheel 17 by virtue of its engagement therewith, through the interlocking pin 26. The pin 26 will register with the opening in the plate 20 when the control sheaves are in their working positions. The pin may then be disengaged to permit independent operation of the wheels 17 and 18 for regulating the speed of the motors.

If one of the wheels 17 or 18 is reversed, the stop lug 23 will engage the dog 24 of the wheel 18 and carry it back to the neutral position. The spring 29 on the lock pin 26 will cause the pin to bear against the web of the wheel 17 until it registers with the opening 25 when it will of its own accord drop in and interlock the wheels 17 and 18. This arrangement effectually prevents the operator from leaving one controller in an operating position and the other one in neutral or reverse position.

It is evident from the foregoing description of my invention that a headache post control device embodying the principles herein set forth provides simple and efficient means for regulating a pair of drilling motors to provide desirable speed torque characteristics for drilling operations. The nature of my device is such as to readily facilitate its application to standard drill rigging and it provides a concentrated control means for the operator in proximity to the drilling tools irrespective of the distance and location of the control members.

Although I have described a specific embodiment of my invention, it will be obvious to those skilled in the art that various modifications may be made in the details of construction, the mode of operation and in the manner of application without departing from the principles herein set forth.

I claim as my invention:

1. A control mechanism comprising a base, a stud shaft mounted therein, a pair of sheave wheels rotatably mounted on said shaft, a lever pivotally mounted thereon, a pivotal key in said shaft adapted to engage one of said wheels and said lever, a pin for interconnecting said wheels and a cover plate having an opening therein secured to said shaft.

2. A control mechanism comprising a base, a stud shaft mounted therein, a pair of sheave wheels rotatably mounted on said shaft, a lever pivotally mounted thereon, a pivotal key in said shaft adapted to engage one of said wheels and said lever, a pin for interconnecting said wheels and a cover plate having an opening therein secured to said shaft, the opening in said cover plate being located to register with said pin when said wheels are in their neutral position.

3. A control mechanism comprising a base, a stud shaft mounted therein, a pair of sheave wheels rotatably mounted on said shaft, a lever pivotally mounted thereon, a pivotal key in said shaft adapted to engage one of said wheels and a cover plate having an opening therein secured to said shaft, said wheels and lever being associated with said key in such a manner that the wheel and lever are respectively operative when the one or the other of them are in their neutral position.

4. A control mechanism comprising a base, a shaft mounted therein, a pair of sheave wheels rotatably mounted on said shaft, a lever pivotally mounted thereon, means for independently operating said wheels, means for interconnecting said wheels, to operate them jointly and means for preventing the joint operation of said lever and wheels.

5. A control mechanism comprising a base, a shaft mounted therein, a pair of sheave wheels rotatably mounted on said shaft, a lever pivotally mounted thereon, means for interlocking said lever with one of said wheels, and means for interconnecting said wheels, said wheel interconnecting means being independent of said lever interlocking means.

6. A control mechanism comprising a base, a shaft mounted therein, a pair of sheave wheel rotatably mounted on said shaft, a lever pivotally mounted thereon, means for interlocking said lever with one of said wheels, and means for interconnecting said wheels, said wheel interconnecting means being independent of said lever interlocking means, and either of said means being effective when the wheels and levers with which it is associated are in their neutral position.

7. A control mechanism comprising a pair of control members and a pole-changing member, manually-operated means for connecting and disconnecting the control members, and means for interlocking one of the control members and the pole-changing member to make the control member operative or inoperative in accordance with the position of said pole-changing member.

8. A control mechanism comprising a pair of control members and a pole-changing member, manually-operated means for connecting and disconnecting the control members, means for preventing the disconnection of the control members in certain positions, and means for interlocking one of the control members and the pole-changing member to make said control member operative or inoperative in accordance with the position of said pole-changing member.

9. A control mechanism comprising a pair of control members and a pole-changing member, manually-operated means for releasably connecting the control members, and means for interlocking one of the control members and the pole-changing member to make the control member operative or inoperative in accordance with the position of said pole-changing member.

In testimony whereof, I have hereunto subscribed my name this thirteenth day of October, 1924.

WILLIAM H. GRANSDEN.